United States Patent
Niwa et al.

(10) Patent No.: US 7,249,749 B2
(45) Date of Patent: Jul. 31, 2007

(54) SOLENOID VALVE WITH 2-PART FIXED CORE

(75) Inventors: Tsuneo Niwa, Komaki (JP); Masayuki Watanabe, Komaki (JP); Yukio Ozawa, Komaki (JP); Shigenobu Nishida, Komaki (JP); Yasunori Nishimura, Komaki (JP); Akiko Kosaka, Komaki (JP)

(73) Assignee: CKD Corporation, Komaki-shi (JP)

( * ) Notice: Subject to any disclaimer, the term of this patent is extended or adjusted under 35 U.S.C. 154(b) by 0 days.

(21) Appl. No.: 10/578,246

(22) PCT Filed: Nov. 9, 2004

(86) PCT No.: PCT/JP2004/016586

§ 371 (c)(1),
(2), (4) Date: May 4, 2006

(87) PCT Pub. No.: WO2005/057064

PCT Pub. Date: Jun. 23, 2005

(65) Prior Publication Data

US 2007/0040139 A1   Feb. 22, 2007

(30) Foreign Application Priority Data

Dec. 9, 2003   (JP) .............................. 2003-410687

(51) Int. Cl.
*F16K 31/02* (2006.01)
(52) U.S. Cl. ................................. 251/129.16; 335/281
(58) Field of Classification Search ........... 251/129.15, 251/129.16; 335/281
See application file for complete search history.

(56) References Cited

U.S. PATENT DOCUMENTS

| | | | |
|---|---|---|---|
| 4,994,122 A | 2/1991 | DeBold et al. | |
| 5,310,160 A | 5/1994 | Harck et al. | |
| 5,368,274 A * | 11/1994 | Falk et al. ............. | 251/129.16 |
| 5,711,342 A * | 1/1998 | Kazama et al. ........ | 251/129.08 |
| 6,131,880 A * | 10/2000 | Hahn et al. ............ | 251/129.16 |

(Continued)

FOREIGN PATENT DOCUMENTS

JP        A 60-151477        8/1985

(Continued)

*Primary Examiner*—John Bastianelli
(74) *Attorney, Agent, or Firm*—Oliff & Berridge PLC (57) ABSTRACT

A solenoid valve capable of handling a corrosive control fluid and developing an increased attraction force. The solenoid valve 1 is adapted such that a fixed core is located in a wound coil 29 and protruding through the lower surface of the coil, a plunger 16 holding a valve sheet 17 is supported by a plate spring 18 under the fixed core, the valve sheet 17 is normally retained in contact with a valve seat 13 by spring force of the plate spring 18, and the valve sheet 17 is separated from the valve seat against the spring force of the plate spring 18 when the coil 29 is energized. The fixed core comprises two parts vertically coupled, an upper one of which is a first fixed core 26 located in the coil 29 in non-contact with the control fluid, the first fixed core being made of a material having high magnetic permeability, and a lower one of which is a second fixed core 27 fitted, protruding downward, in the coil bobbin to cover the lower end of the coil bobbin, the second fixed core being made of a material having corrosion resistance to the high-corrosive control fluid.

4 Claims, 9 Drawing Sheets

U.S. PATENT DOCUMENTS

| | | | |
|---|---|---|---|
| 6,339,366 B1 * | 1/2002 | Meisiek | 335/281 |
| 6,415,817 B1 * | 7/2002 | Krimmer et al. | 251/129.16 |
| 6,460,521 B1 * | 10/2002 | Modien | 335/281 |
| 6,715,475 B2 * | 4/2004 | Cook | 251/129.15 |

FOREIGN PATENT DOCUMENTS

| | | |
|---|---|---|
| JP | U 61-186873 | 11/1986 |
| JP | A 63-13975 | 1/1988 |
| JP | A 3-115546 | 5/1991 |
| JP | A 5-263958 | 10/1993 |
| JP | A 11-82800 | 3/1999 |
| JP | A 2002-357280 | 12/2002 |

* cited by examiner

FIG. 9B

SOLENOID VALVE WITH 2-PART FIXED CORE

TECHNICAL FIELD

The present invention relates to a solenoid valve for controlling the stroke of a valve element by balance between an attraction force of a fixed core and a restoring force of a plate spring and, more particularly, to a solenoid valve for use in a mass flow controller or the like for handling corrosive gases.

BACKGROUND ART

Figure 2:
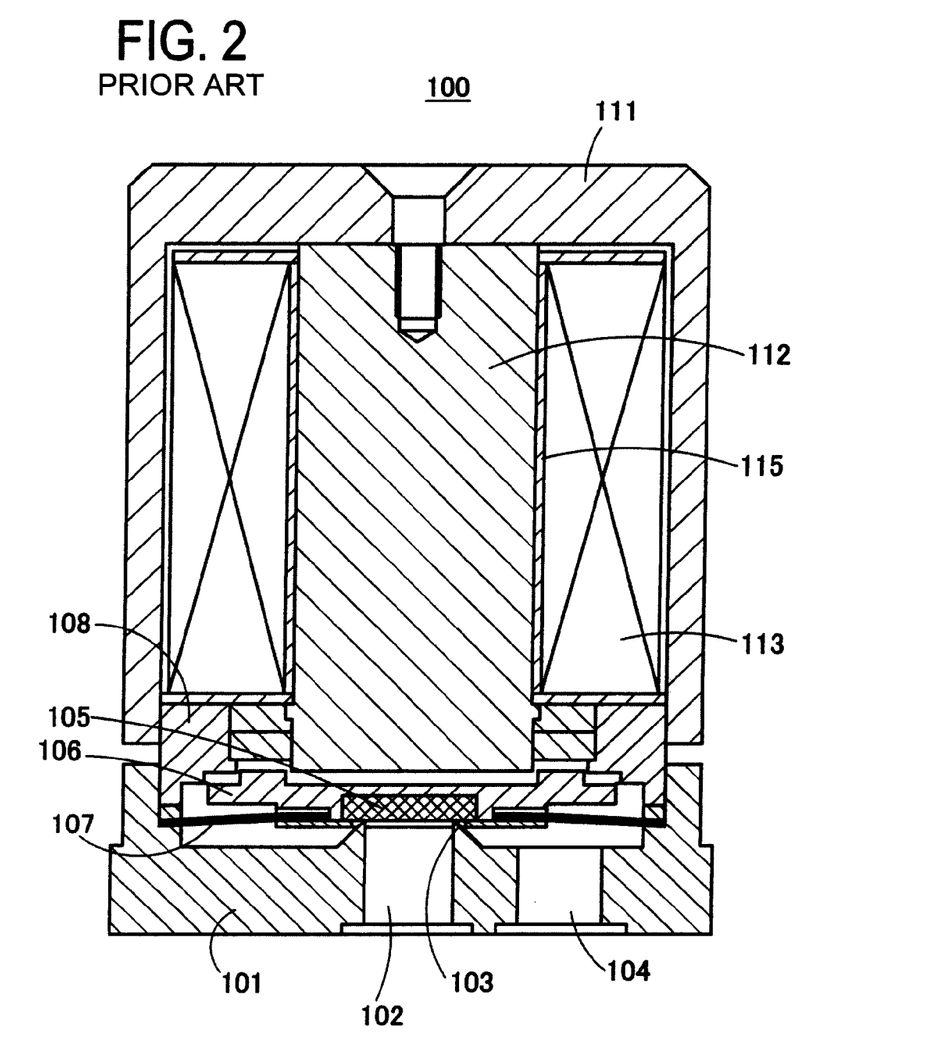
FIG. 2 is a sectional view of a conventional solenoid valve.

A conventional solenoid valve used in a mass flow controller or the like to control the stroke of a valve element by balance between an attraction force of a fixed core and a restoring force of a plate spring may include for example a solenoid valve 100 of a normal closed type shown in FIG. 2.

This solenoid valve 100 includes a body 101 formed with an inlet passage 102 and an outlet passage 104, and a valve seat 103 projecting upward at an upper opening of the inlet passage 102. A valve sheet 105 which can be brought into contact with or separated from the valve seat 103 is supported, together with a plunger 106, by a plate spring 107. The plate spring 107 is pressed by a retainer 108 of which the peripheral edge is engaged in the body 101. A bonnet 111 serving as a yoke is fitted on the retainer 108. In this bonnet 111, a fixed core 112 is centrally secured. This fixed core 112 is disposed in a coil bobbin 115 around which a coil 113 is wound so that the fixed core 112 protrudes downward from the coil bobbin 115 with a small clearance between the lower end surface of the fixed core 112 and the plunger 106.

This solenoid valve 100 is normally held in a valve-closed state where the valve sheet 105 is pressed against the valve seat 103 by the spring force of the plate spring 107. When current is supplied to the coil 113, the fixed core 112 is magnetized, attracting the plunger 106 upward against the spring force of the plate spring 107. Accordingly, the valve sheet 105 is separated from the valve seat 103 to provide communication between the inlet passage 102 and the outlet passage 104, allowing control fluid to flow therethrough.

When the amount of current to be applied to the coil 113 is changed, an electromaanetic attraction force will accordingly vary. Thus, the amount of stroke of the plunger 106 is changed to adjust the degree of valve opening between the valve seat 103 and the valve sheet 105. It is accordingly possible to control the flow rate of control fluid to be allowed to flow into a secondary side through the outlet passage 104.

[Patent Document 1] Jpn. unexamined patent publication No. 2002-357280

DISCLOSURE OF THE INVENTION

Problems to be Solved by the Invention

However, if the conventional solenoid valve 100 is to be operated to flow a large flow rate of fluid, the electromagnetic attraction force generated by energization of the coil 113 would be insufficient to attract the plunger 106 upward to the fixed core 112 side. It is therefore firstly conceivable that increasing the size of the solenoid valve 100 itself with an increase in the winding number of the coil 113 may be effective in producing a sufficient attraction force. However, such large-sized solenoid valve may have an undesirable influence on a semiconductor manufacturing device or the like into which the solenoid valve could be integrated. Further, it is also conceivable that the amount of current to be applied to the coil 113 is increased to raise a magnetomotive force (AT). However, this configuration adversely would increase a heating value.

The mass flow controller in which the solenoid valve 100 is used is arranged to handle high-corrosive control fluid. Accordingly, the fixed core 112 may generate a larger attraction force if made of a material having high magnetic permeability, but the fixed core 112 will come in contact with high-corrosive control fluid in view of structure. However there is no appropriate material capable of increasing the attraction force and having corrosive resistance.

DISCLOSURE OF INVENTION

The present invention has been made to solve the above problems and has a purpose to provide a solenoid valve capable of handling a corrosive control fluid and developing an increased attraction force.

The solenoid valve of the present invention is characterized in that a solenoid valve adapted such that a fixed core located in a wound coil and protruding downward from a wound coil, a plunger is supported under the fixed core by a plate spring and holds a valve sheet which is normally retained in contact with a valve seat by spring force of the plate spring, and the valve sheet is separated from the valve seat against the spring force of the plate spring when the coil is energized, wherein the fixed core comprises two parts vertically coupled, an upper one of which is a first fixed core located in a coil bobbin around which the coil is wound and in non-contact with a control fluid, the first fixed core being made of a material having high magnetic permeability, and a lower one of which is a second fixed core fitted, protruding downward, in the coil bobbin to cover a lower end of the coil bobbin, the second fixed core being made of a material having corrosion resistance to a high-corrosive control fluid.

Further, the solenoid valve of the present invention is characterized in that the first fixed core is made of electromaanetic soft iron.

The solenoid valve of the present invention having the above structure is normally held in a valve-closed state where the valve sheet is pressed against the valve seat by a restoring force (a spring force) of the plate spring. When current is applied to the coil, the first fixed core made of electromagnetic soft iron or the like is magnetized, attracting the plunger upward against the spring force of the plate spring. In the case where the second fixed core is made of a magnetic material such as ferritic stainless steel, the second fixed core can also be magnetized.

When the plunger is moved up and thus the valve sheet is separated from the valve seat, the inlet passage of the valve is brought into communication with the outlet passage to allow the control fluid to flow therethrough. At this time, when the amount of current to be applied to the coil is changed to change the electromagnetic attraction force, the stroke amount of the plunger can be changed, adjusting the degree of a valve opening between the valve seat and the valve sheet. This makes it possible to control the flow rate of the control fluid to be allowed to flow therethrough.

EFFECTS OF THE INVENTION

According to the present invention, the fixed core comprises two separate parts, an upper one of which is the first fixed core, made of a material with high magnetic permeability, located in the coil and in non-contact with the control fluid, and a lower one of which is the second fixed core, made of a material having corrosion resistance to the high-corrosive control fluid, located protruding downward from the coil. Accordingly, the solenoid valve capable of handling a corrosive control fluid and developing an increased attraction force can be provided.

Especially, the first fixed core is made of electromagnetic soft iron, so that it can attract the plunger upward by a larger attraction force than conventional one without increasing the current to be applied to the coil. Thus, a larger flow rate of the control fluid can be handled.

Since the first fixed core is in non-contact with the control fluid, further, the first fixed core may be made of an electromaanetic soft iron with low resistance to corrosion. The second fixed core is made of a material superior in corrosion resistance, in particular, ferritic stainless steel is preferable in view of the corrosion resistance and the property of allowing a magnetic flux to pass therethrough.

BRIEF DESCRIPTION OF DRAWINGS

FIG. 4A is a graph showing a relationship between a stroke and an attraction force of the solenoid valve in the embodiment and the conventional solenoid valve under conditions of a magnetomotive force of 500 AT;

FIG. 4B is a graph showing a relationship between a stroke and an attraction force of the solenoid valve in the embodiment and the conventional solenoid valve under conditions of a magnetomotive force of 900 AT;

EXPLANATION OF REFERENCE SIGNS

1 Solenoid valve
11 Body
13 Valve seat
16 Plunger
17 Valve sheet
18 Plate spring
26 First fixed core
27 Second fixed core
29 Coil

BEST MODE FOR CARRYING OUT THE INVENTION

Figure 1:
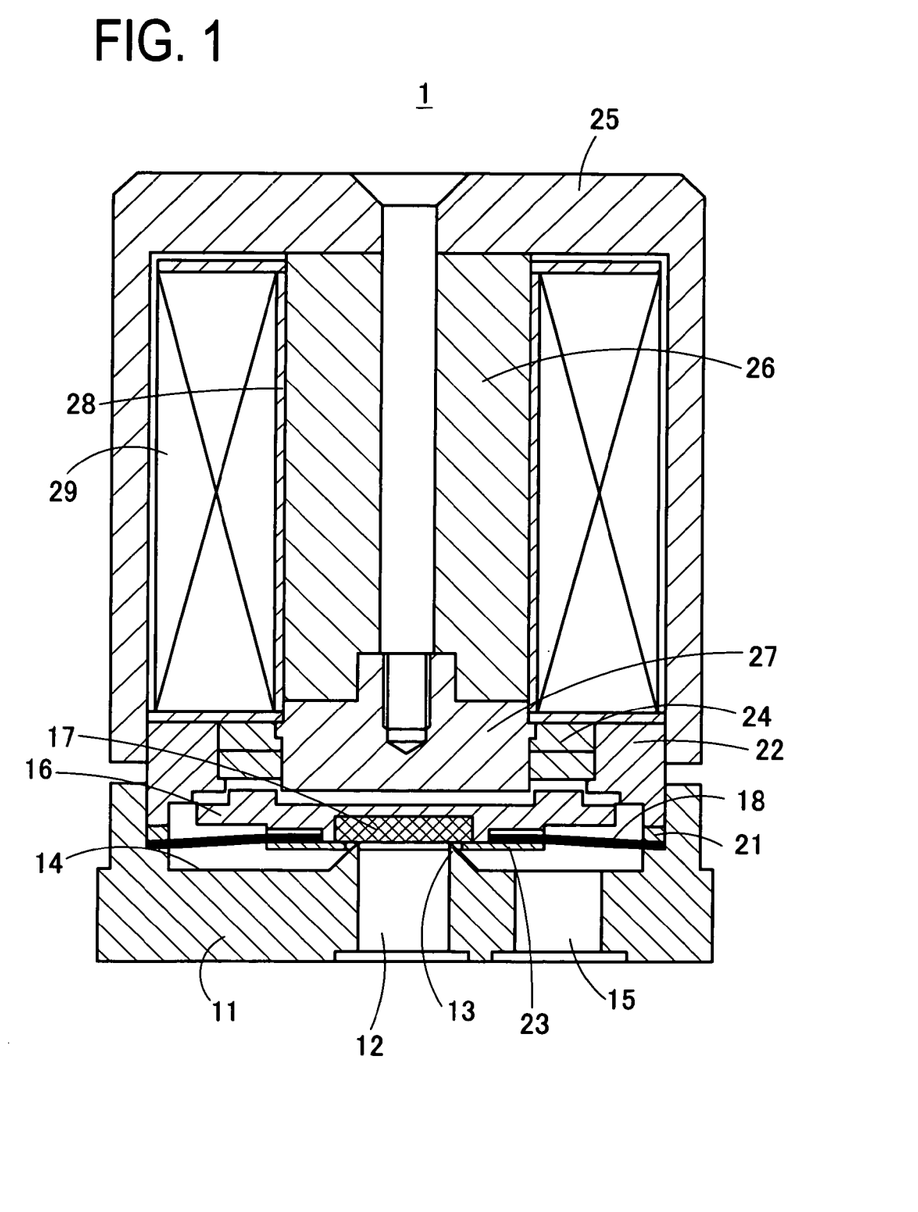
FIG. 1 is a sectional view of a solenoid valve in a first embodiment according to the present invention.

A preferred embodiment of a solenoid valve according to the present invention will be explained below, referring to the accompanying drawings. FIG. 1 is a sectional view of the solenoid valve in the present embodiment.

The solenoid valve 1 in the present embodiment includes a body 11 formed with an inlet passage 12 and an outlet passage 15 each of which is vertically formed through the body 11. The inlet passage 12 and the outlet passage 15 are formed opening into an annular recess 14 formed in the top of the body 11 so that the inlet passage 12 is arranged in the center of the body 11. At the upper end of the inlet passage 12, a valve seat 13 is formed projecting upward. The solenoid valve 1 is provided with a valve sheet 17 which can be brought into contact with or separated from the valve seat 13. The valve sheet 17 is arranged integrally with a plunger 16.

In the recess 14 of the body 11, a plate spring 18 having a circular shape matching the shape of the recess 14 is engaged so that the peripheral edge of the plate spring 18 is pressed in place from above by a retainer 22 through an annular spacer 21. The plunger 16 is fitted from above in the center portion of the plate spring 18, while the valve sheet 17 embedded in the bottom of the plunger 16 is supported by a valve-sheet holding plate 23 fixed to the underside of the plate spring 18. It is to be noted that the plate spring 18, the plunger 16, the valve sheet 17, and the valve-sheet holding plate 23 are assembled integrally by welding. The peripheral edge of the plate spring 18 is pressed at the level below the valve seat 13, so that the plate spring 18 is held in a warped state, producing a restoring force to normally bring the valve sheet 17 into contact with the valve seat 13.

The retainer 22 is also engaged in the body 11 and a bonnet serving as a yoke is fitted on the retainer 22 from above. In this bonnet 25, a first fixed core 26 and a second fixed core 27 are vertically coupled together with a bolt inserted from above. Around the first fixed core 26, a coil 29 wound around the a coil bobbin 28 is disposed. Specifically, the first fixed core 26 is located inside the coil bobbin 28 and the second fixed core 27 is located protruding downward through the lower end of the coil bobbin 28 into the retainer 22, reaching to just above the plunger 16.

The thus constructed solenoid valve 1 can be incorporated in for example a mass flow controller for controlling a mass flow rate of a control fluid such as organometallic gas (e.g., TMB, TEOS), halogen, and hydrogen halide, which are used in the industries for semiconductor parts, optical elements, magnetic recording devices, and others, or their carrier gasses such as nitrogen, argon, helium, and water vapor or oxygen as needed. Since such control fluid which will flow in the solenoid valve 1 is high corrosive, accordingly, the portions of the solenoid valve 1 which will come in contact with the control fluid, e.g., the portions forming a flow passage and a valve chamber, need to have resistance to corrosion. For this purpose, the body, plunger, and plate spring of the conventional solenoid valve 100 are made of SUS316L, 317L, Ni alloy, Fe—Co alloy, or the like. Under these circumstances, the fixed core 112 would commonly be made of ferritic stainless steel, SUSXM27, which is resistant to corrosion and allows a magnetic flux to pass therethrough. However, this material is low in magnetic permeability and thus could not provide a sufficient electromaanetic attraction force as previously mentioned as the problems to be solved.

To solve the problems, thus, the solenoid valve 1 in the present embodiment is adapted such that a fixed core comprises two separate parts, upper and lower, that is, the first fixed core 26 and the second fixed core 27. The first fixed core 26 constitutes a large portion of the fixed core and located inside the coil bobbin 28. On the other hand, the second fixed core 27 protruding downward from the coil bobbin 28 is placed within the retainer 22, interposing a fitting member 24 between the outer periphery of the second fixed 27 and the retainer 22. Those second fixed core 27, the retainer 22, and the fitting member 24 are integrally formed by welding. Thus, the first fixed core 26 is in a non-contact state with the control fluid by such second fixed core 27 and others. The first fixed core 26 is made of SUY (electromagnetic soft iron) or the like, having high magnetic permeability. The second fixed core 27 which will come in contact with the high-corrosive control fluid is made of ferritic stainless steel. The ferritic stainless steel may include a magnetic material having high corrosion resistance, such as SUS444 and conventionally used SUSXM 27. In the case where the first fixed core 26 with high magnetic permeability constitutes the large portion of the fixed core, the second fixed core 27 does not always need be made of a magnetic material and instead may be made of a non-magnetic substance.

The solenoid valve 1 having the above structure is normally in a valve-closed state where the valve sheet 17 is held against the valve seat 13 by the restoring force (spring force) of the plate spring 18. When current is applied to the coil 29, magnetizing the first fixed core 26 (and also the second fixed core 27 if made of a magnetic material), the plunger 16 is attracted upward against the spring force of the plate spring 18. Then when the valve sheet 17 is separated from the valve seat 13, the inlet passage 12 is brought into communication with the outlet passage 15, allowing the control fluid to flow into the secondary side through the outlet passage 15. At this time, changing of the current to be applied to the coil 29 causes a change in the electromagnetic attraction force. The amount of stroke of the plunger 16 is thus changed to adjust the valve opening degree between the valve seat 13 and the valve sheet 17. This makes it possible to control the flow rate of the control fluid to be allowed to flow out through the outlet passage 15.

Figure 3:
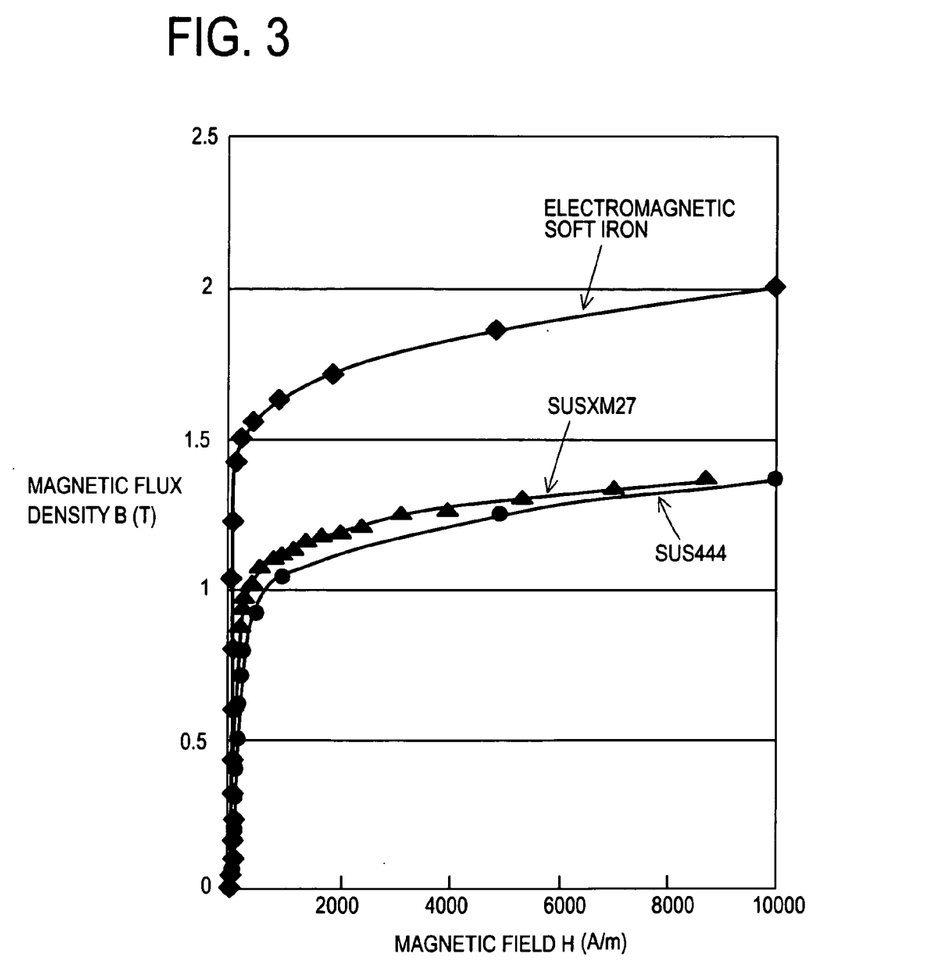
FIG. 3 is a graph showing a B—H curve of electromagnetic soft iron forming a first fixed core of the solenoid valve in the embodiment and a B—H curve of SUS forming a fixed core of the conventional solenoid valve.

Comparisons were made in the electromagnetic attraction force between the solenoid valve 1 in the present embodiment shown in FIG. 1 and the conventional solenoid valve 100 shown in FIG. 2. First, FIG. 3 shows a graph with a B—H curve of electromagnetic soft iron forming the first fixed core 26 of the solenoid valve 1 in the present embodiment and a B—H curve of stainless steel forming the fixed core 112 of the conventional solenoid valve 100. From these curves, it is obvious that the electromagnetic soft iron has a higher magnetic flux density B (T) to a magnetic field H (A/m) than the stainless steel has. When the fixed core is made of electromagnetic soft iron, it is accordingly possible to increase the magnetic flux without increasing the amount of current to be applied to the coil. This is conceivably effective in increasing the attraction force for attracting the plunger upward.

Figure 4A:
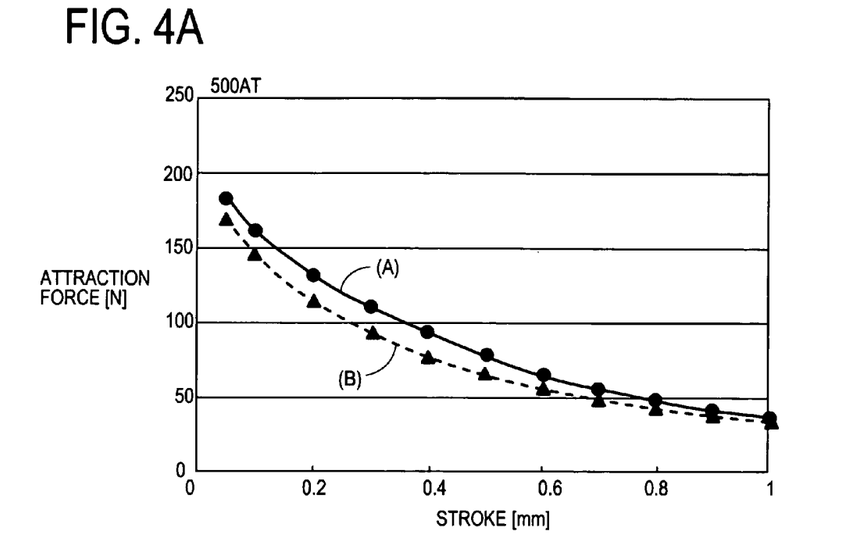
Figure 4B:
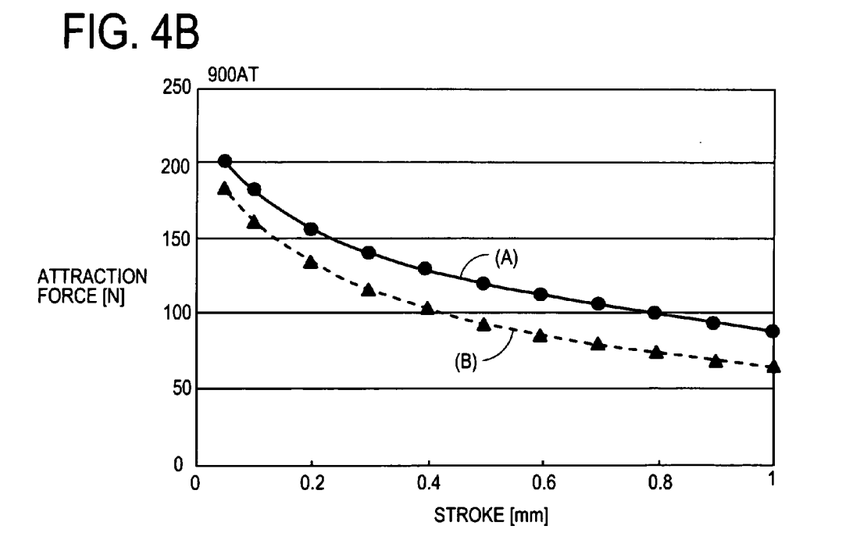
Figure 5A:
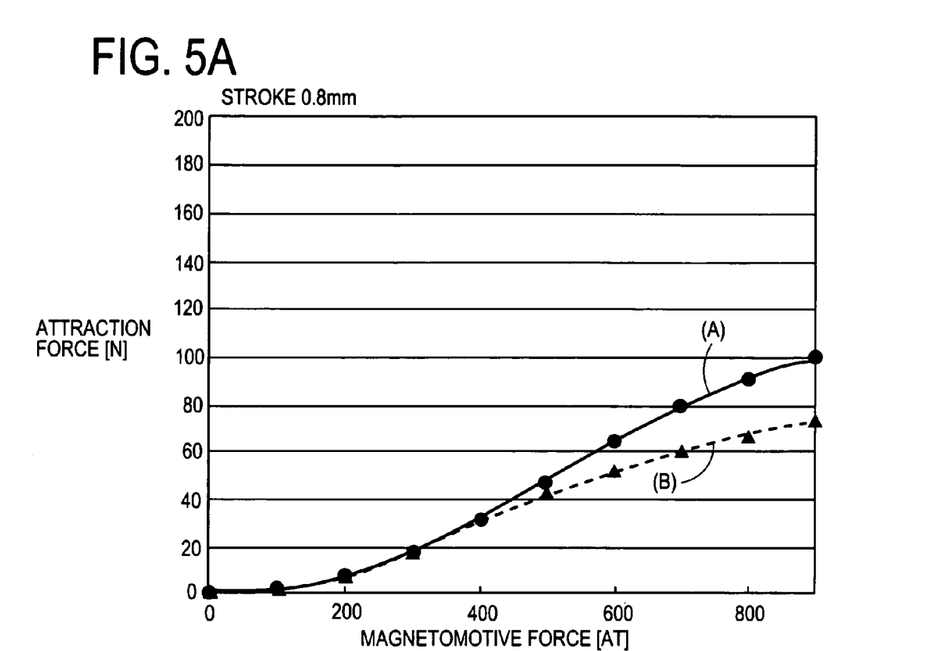
FIG. 5A is a graph showing a relationship between a magnetomotive force (AT) and an attraction force of the solenoid valve in the embodiment and the conventional solenoid valve under conditions of a stroke of 0.8 mm.
Figure 5B:
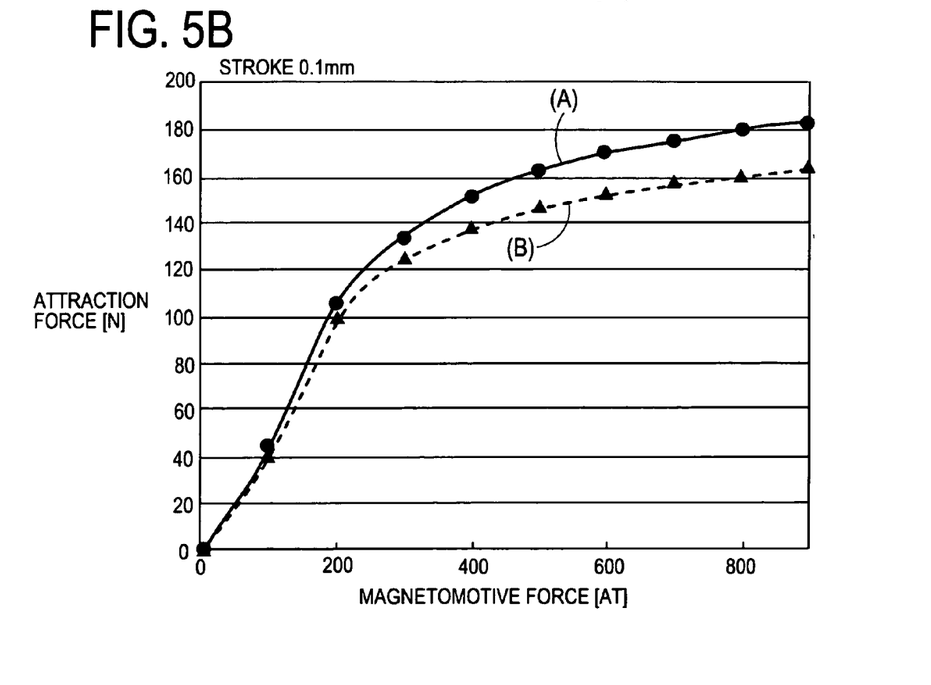
FIG. 5B is a graph showing a relationship between a magnetomotive force (AT) and an attraction force of the solenoid valve in the embodiment and the conventional solenoid valve under conditions of a stroke of 0.1 mm.

FIG. 4A is a graph showing a relationship between a stroke and an attraction force of the solenoid valve 1 (A) and the solenoid valve 100 (B) under conditions of a magnetomotive force of 500 AT. FIG. 4B is a graph showing a relationship between a stroke and an attraction force of the solenoid valve 1 (A) and the solenoid valve 100 (B) under conditions of a magnetomotive force of 900 AT. FIG. 5A is a graph showing a relationship between a magnetomotive force (AT) and an attraction force of the solenoid valve 1 (A) and the solenoid valve 100 (B) under conditions of a stroke of 0.8 mm. FIG. 5B is a graph showing a relationship between a magnetomotive force (AT) and an attraction force of the solenoid valve 1 (A) and the solenoid valve 100 (B) under conditions of a stroke of 0.1 mm.

The stroke shown as the horizontal axis represents a distance from the lower end face of the fixed core to the upper end face of the plunger.

In both of the cases of magnetomotive forces of 500 AT and 900 AT, as shown in FIGS. 4A and 4B, the solenoid valve 1 (A) indicated by a solid line could produce a larger attraction force. Specifically, the attraction force of the solenoid valve 1 (A) was larger by about 30% than that of the solenoid valve 100 (B). Thus, the larger attraction force could be produced for each stroke even by the same magnetomotive force. It is therefore possible to increase the attraction force without increasing the amount of current to be applied to the coil, thereby allowing a large flow rate of control fluid to flow while suppressing power consumption and heat generation in the coil.

As shown in FIGS. 5A and 5B, furthermore, in both of the cases of the strokes of 0.8 mm and 0.1 mm, the solenoid valve 1 (A) indicated by a solid line produced a larger attraction force by the same magnetomotive force to that for the solenoid valve 100 (B). It is therefore found from those graphs that the same attraction force could be obtained even by a reduced amount of supply current, so that power consumption and heat generation in the coil can be reduced.

According to the solenoid valve 1 in the present embodiment as above, a larger attraction force can be obtained even by the same magnetomotive force as that for the conventional solenoid valve 100 (B). This makes it possible to restrain the supply current needed for producing a predetermined attraction force, thereby reducing heat generation in the coil. To the contrary, a large flow rate of fluid can be controlled by the same amount of supply current as before.

Figure 6:
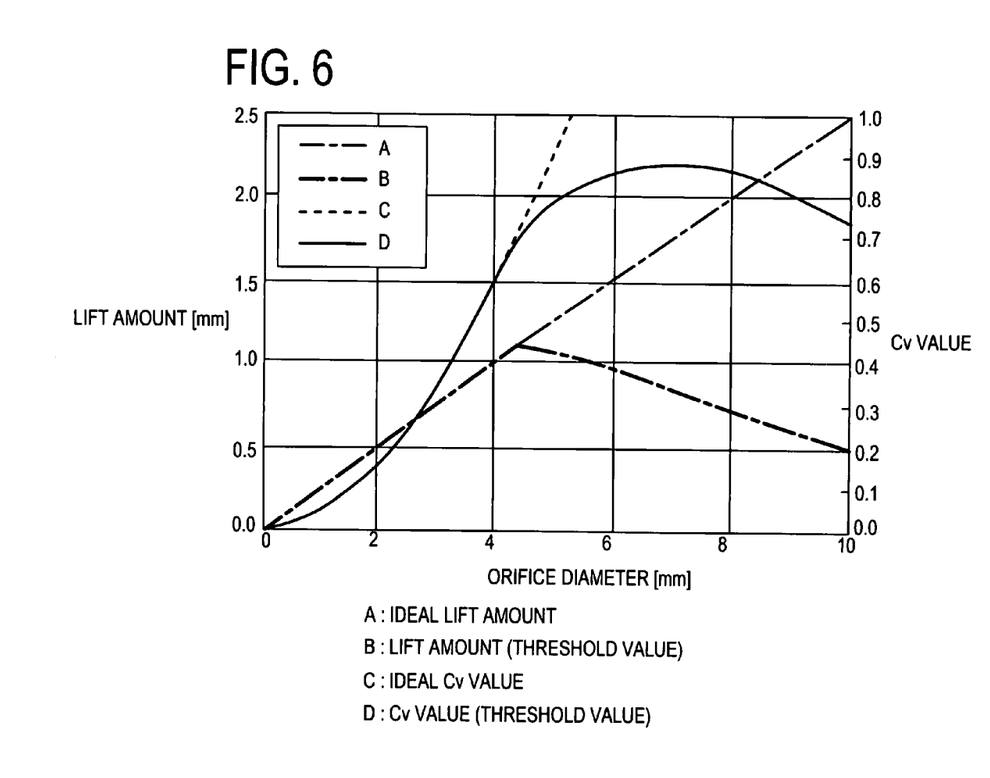
FIG. 6 is a graph showing a relationship between a Cv value and a lift amount and an orifice diameter of the solenoid valve in the embodiment.
Figure 7:
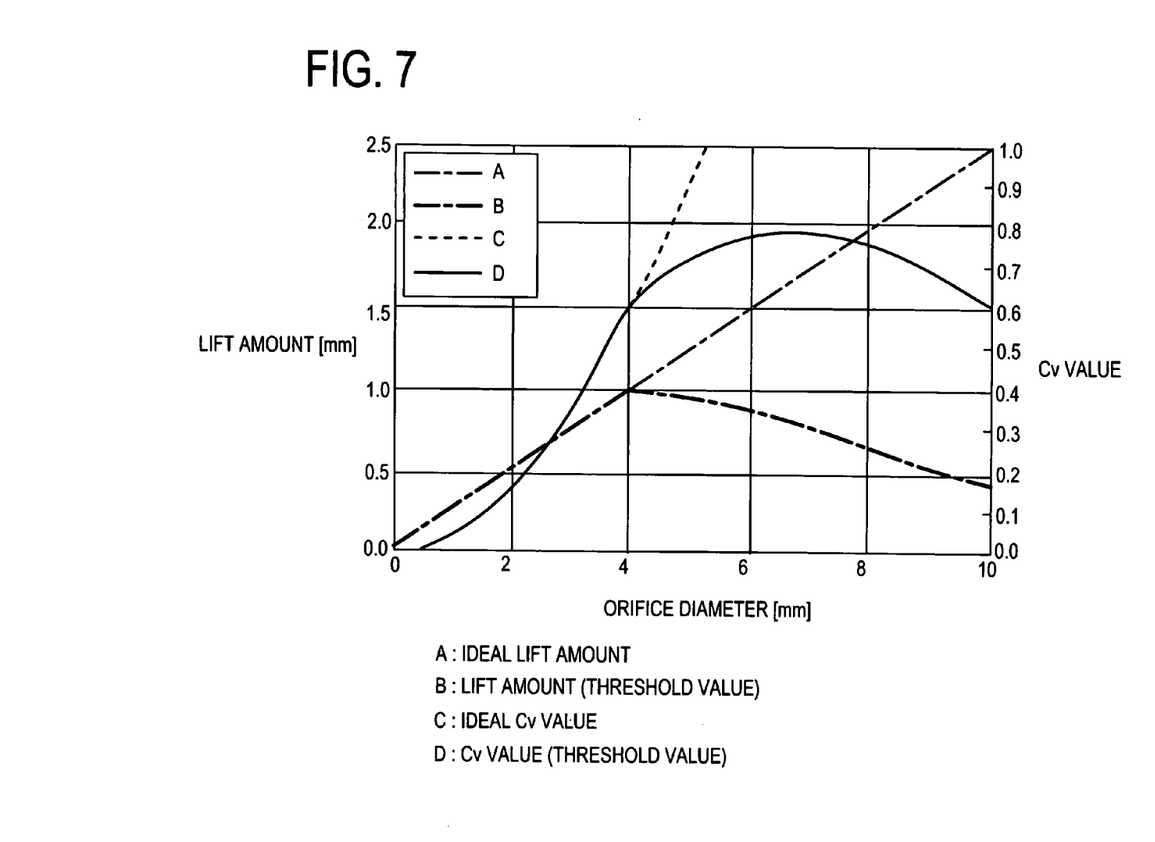
FIG. 7 is a graph showing a relationship between a Cv value and a lift amount and an orifice diameter of the conventional solenoid valve.

FIG. 6 shows a relationship between Cv value and Lift amount of the solenoid valve 1 with respect to the orifice diameter. FIG. 7 similarly shows a relationship between Cv value and Lift amount of the solenoid valve 100 with respect to the orifice diameter. It is also found from those graphs that the lift amount in the solenoid valve 1 shown in FIG. 6 could be increased more than that in the solenoid valve 100 shown in FIG. 7, as well as the Cv value.

Figure 8:
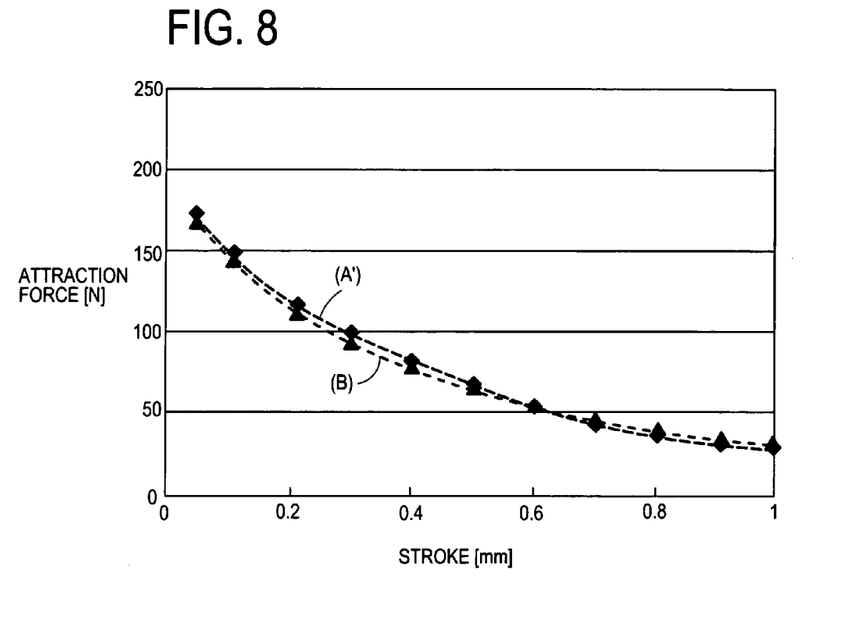
FIG. 8 is a graph showing a relationship between a stroke and an attraction force of the solenoid valve in the embodiment and the conventional solenoid valve.
Figure 9A:
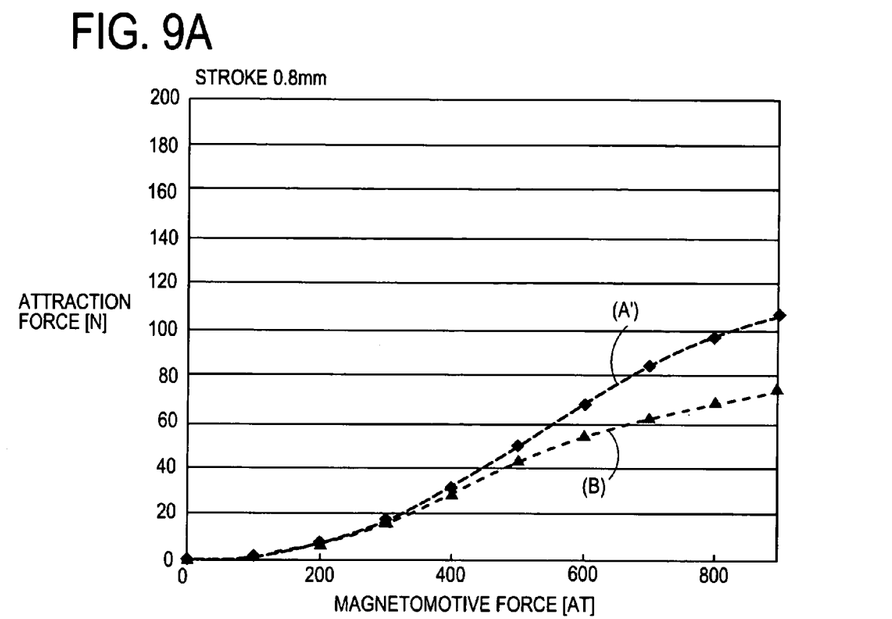
FIG. 9A is a graph showing a relationship between a magnetomotive force sand an attraction force of the solenoid valve in the embodiment and the conventional solenoid valve under conditions of a stroke of 0.8 mm.
Figure 9B:
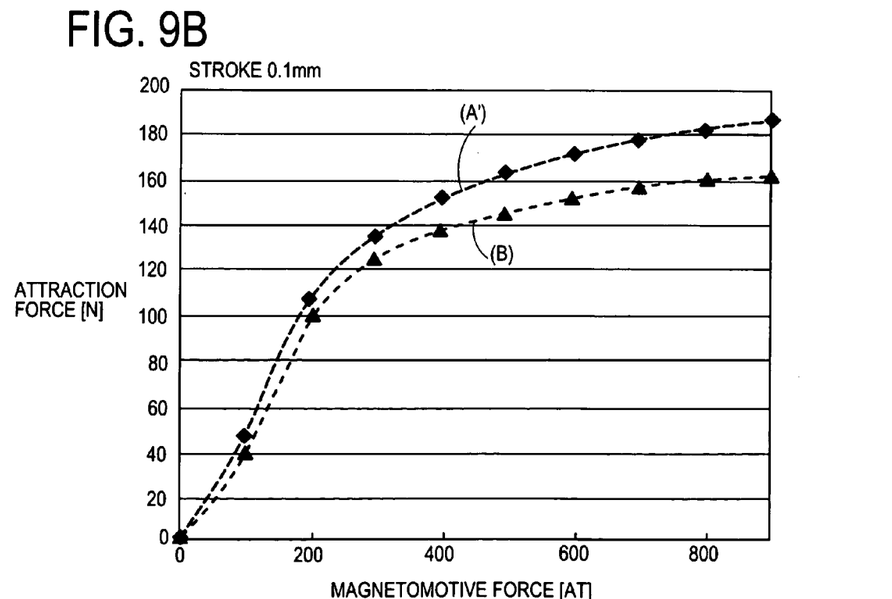
FIG. 9B is a graph showing a relationship between a magnetomotive force and an attraction force of the solenoid valve in the embodiment and the conventional solenoid valve under conditions of a stroke of 0.1 mm.

It is next assumed that the solenoid valve 1 in the present embodiment having the above improved performances was reduced in size. Specifically, although the solenoid valves 1 and 100 in FIGS. 1 and 2 used the equal sized coils, the coil 29 of the solenoid valve 1 was smaller in winding number, forming a small-sized coil in an axial (vertical) direction. Then, comparisons were made between the small-sized solenoid valve 1 (A') and the solenoid valve 100 (B). FIG. 8 is a graph showing a relationship between stroke and attraction force. FIG. 9A shows a relationship between a stroke and an attraction force in the case of a stroke of 0.8 mm. FIG. 9B shows a relationship between a stroke and an attraction force in the case of a stroke of 0.1 mm.

In the case shown in FIG. 8 where the current was supplied at the same value, the small-sized solenoid valve 1 (A') having the smaller coil winding number had a magnetomotive force of 440 AT, while the solenoid valve 100 (B) had a magnetomotive force of 500 AT. It is found from this graph that, for the magnetomotive force equalized by the same current value, the solenoid valve 1 (A') reduced in size by a reduction in the coil winding number could produce an attraction force substantially equal to the conventional solenoid valve 100 (B). Accordingly, as shown in FIGS. 9A and 9B, in each case where the magnetomotive force was changed under conditions of a fixed stroke, i.e., where the supply current was increased, the solenoid valve 1 (A') could produce a larger attraction force by the same magnetomotive force, as also found from results shown in FIG. 8.

The above explanations are made on one preferred embodiment of the solenoid valve of the present invention, but the present invention may be embodied in other specific forms without departing from the essential characteristics thereof.

The invention claimed is:

1. A solenoid valve for controlling the flow of a control fluid, comprising:
    a coil wound around a coil bobbin;
    a fixed core located in the coil and protruding downward from the coil;
    a valve seat;
    a plunger supported under the fixed core by a plate spring;
    a valve sheet held in the plunger and normally retained in contact with the valve seat;
    the valve sheet being capable of separating from the valve seat against the spring force of the plate spring when the coil is energized, wherein
    the fixed core comprises two parts vertically coupled, an upper one of which is a first fixed core located in the coil bobbin and in non-contact with the control fluid, the first fixed core being made of a material having high magnetic permeability, and a lower one of which is a second fixed core fit, protruding downward, in the coil bobbin to cover a lower end of the coil bobbin, the second fixed core being made of a material having corrosion resistance to a high-corrosive control fluid, the material of the first fixed core being different than the material of the second fixed core.

2. The solenoid valve according to claim 1, wherein the first fixed core is made of electromagnetic soft iron.

3. The solenoid valve according to claim 1, wherein the second fixed core is made of ferritic stainless steel.

4. The solenoid valve according to claim 2, wherein the second fixed core is made of ferritic stainless steel.

* * * * *